United States Patent
Bikumala et al.

(10) Patent No.: US 11,935,220 B1
(45) Date of Patent: Mar. 19, 2024

(54) USING ARTIFICIAL INTELLIGENCE (AI) TO DETECT DEBRIS

(71) Applicant: Shiv S Naimpally, Leander, TX (US)

(72) Inventors: Sri Sahasra Bikumala, Leander, TX (US); Sisira Bikumala, Leander, TX (US)

( * ) Notice: Subject to any disclaimer, the term of this patent is extended or adjusted under 35 U.S.C. 154(b) by 0 days.

(21) Appl. No.: 18/233,400

(22) Filed: Aug. 14, 2023

(51) Int. Cl.
- *G06T 7/00* (2017.01)
- *A47L 9/28* (2006.01)
- *G06T 7/60* (2017.01)
- *G06T 7/70* (2017.01)
- *B64U 10/00* (2023.01)
- *B64U 101/30* (2023.01)

(52) U.S. Cl.
CPC .......... *G06T 7/0002* (2013.01); *A47L 9/2805* (2013.01); *A47L 9/2894* (2013.01); *G06T 7/60* (2013.01); *G06T 7/70* (2017.01); *A47L 2201/06* (2013.01); *B64U 10/00* (2023.01); *B64U 2101/30* (2023.01); *G06T 2207/10032* (2013.01); *G06T 2207/20081* (2013.01)

(58) Field of Classification Search
CPC .......... G06T 7/0002; G06T 7/60; G06T 7/70; G06T 2207/10032; G06T 2207/20081; A47L 9/2805; A47L 9/2894; A47L 2201/06; B64U 10/00; B64U 2101/30
See application file for complete search history.

(56) References Cited

U.S. PATENT DOCUMENTS

| | | | |
|---|---|---|---|
| 7,016,536 B1* | 3/2006 | Ling | G06V 30/15 |
| | | | 382/290 |
| 9,774,911 B1* | 9/2017 | Thomas | G10L 25/51 |
| 2005/0192707 A1* | 9/2005 | Park | G05D 1/0272 |
| | | | 700/259 |
| 2008/0040945 A1* | 2/2008 | Buckner | E02F 3/8891 |
| | | | 34/406 |
| 2013/0139349 A1* | 6/2013 | Lles | A47L 9/04 |
| | | | 15/383 |
| 2014/0277757 A1* | 9/2014 | Wang | F24F 11/46 |
| | | | 700/276 |
| 2015/0052703 A1* | 2/2015 | Lee | G05D 1/0255 |
| | | | 701/28 |
| 2016/0022107 A1* | 1/2016 | Kim | A47L 11/4011 |
| | | | 901/1 |
| 2016/0135655 A1* | 5/2016 | Ahn | G05D 1/0044 |
| | | | 15/319 |
| 2016/0167233 A1* | 6/2016 | Zhang | B25J 9/1697 |
| | | | 901/1 |
| 2016/0278599 A1* | 9/2016 | Seo | G05D 1/024 |
| 2018/0004275 A1* | 1/2018 | Tubbs | G06F 1/3287 |
| 2018/0113212 A1* | 4/2018 | Tachibana | G01S 15/32 |

(Continued)

Primary Examiner — Xuemei G Chen
(74) Attorney, Agent, or Firm — Shiv S. Naimpally

(57) ABSTRACT

In some aspects, a debris detector includes one or more processors and a memory storage device to store instructions executable by the one or more processors to: receive a frame captured by a camera, receive a subsequent frame captured by the camera, compare the frame to the subsequent frame to determine a difference, and based on determining that the difference is greater than a threshold, send a notification indicating that debris has been detected. The notification may include location data identifying a location where the debris is located. Receiving the notification may cause a robot vacuum to initiate cleaning the location identified in the notification.

20 Claims, 5 Drawing Sheets

(56) References Cited

U.S. PATENT DOCUMENTS

| | | | | |
|---|---|---|---|---|
| 2018/0168015 A1* | 6/2018 | Casey | ............... | G06T 7/11 |
| 2019/0029486 A1* | 1/2019 | Suvarna | ............... | A47L 9/2857 |
| 2019/0051191 A1* | 2/2019 | Mosher | ............... | G08G 5/0069 |
| 2019/0117028 A1* | 4/2019 | Jeong | ............... | A47L 9/2852 |
| 2019/0213755 A1* | 7/2019 | Bassa | ............... | G06F 18/24133 |
| 2020/0193617 A1* | 6/2020 | Bennett | ............... | H04N 7/185 |
| 2020/0338764 A1* | 10/2020 | Jung | ............... | G06T 7/262 |
| 2021/0138640 A1* | 5/2021 | Choi | ............... | A47L 9/2894 |
| 2021/0200234 A1* | 7/2021 | Song | ............... | G05D 1/0246 |
| 2021/0357654 A1* | 11/2021 | Adam | ............... | G06V 20/52 |
| 2022/0022713 A1* | 1/2022 | Honda | ............... | A47L 9/009 |
| 2022/0167813 A1* | 6/2022 | Thakkar | ............... | A47L 9/2815 |
| 2022/0291139 A1* | 9/2022 | Nicholas | ............... | G01N 15/1434 |
| 2022/0309851 A1* | 9/2022 | Ehrlich | ............... | G07C 9/00571 |
| 2023/0077169 A1* | 3/2023 | Tsurumi | ............... | H04N 13/296 |

\* cited by examiner

USING ARTIFICIAL INTELLIGENCE (AI) TO DETECT DEBRIS

BACKGROUND OF THE INVENTION

Field of the Invention

This invention relates to a detector that uses artificial intelligence to detect debris on surfaces (e.g., floors, walls, counters, and the like). When debris is detected, the detector sends a notification to a computer device (e.g., smartphone), a robotic vacuum cleaner, another type of device, or any combination thereof.

Description of the Related Art

A house, a warehouse, a store, or other indoor or outdoor location may undergo periodic cleaning to keep it clean. For example, a cleaning crew may be scheduled to go through and clean a store every day, such as at a particular time when there are relatively few customers present. As another example, a homeowner may schedule a robotic vacuum to clean a house when the homeowner is out of the house, when children are at school, or the like. Cleaning activities are typically scheduled as a "once a day" activity that occurs when relatively few people are present, at the same time every day. If an event (e.g., beverage spill, glass or dishware breakage, or the like) occurs that causes debris to be present, the debris is not cleaned until the preset time at which cleaning is scheduled. This may result in the debris being present for a significant length of time (e.g., up to 23+ hours). Besides being unsightly, if the debris includes potentially harmful substances, such as, for example, sharp objects (e.g., broken glass), toxic or poisonous chemicals, or the like, then humans, pets, and the like could be injured if the debris is not removed.

SUMMARY OF THE INVENTION

This Summary provides a simplified form of concepts that are further described below in the Detailed Description. This Summary is not intended to identify key or essential features and should therefore not be used for determining or limiting the scope of the claimed subject matter.

In some aspects, a debris detector includes one or more processors and a memory storage device to store instructions executable by the one or more processors to: receive a frame captured by a camera, receive a subsequent frame captured by the camera, compare the frame to the subsequent frame to determine a difference, and based on determining that the difference is greater than a threshold, send a notification indicating that debris has been detected. The notification may include location data identifying a location where the debris is located. Receiving the notification may cause a robot vacuum to initiate cleaning the location identified in the notification.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

DETAILED DESCRIPTION

Figure 1:
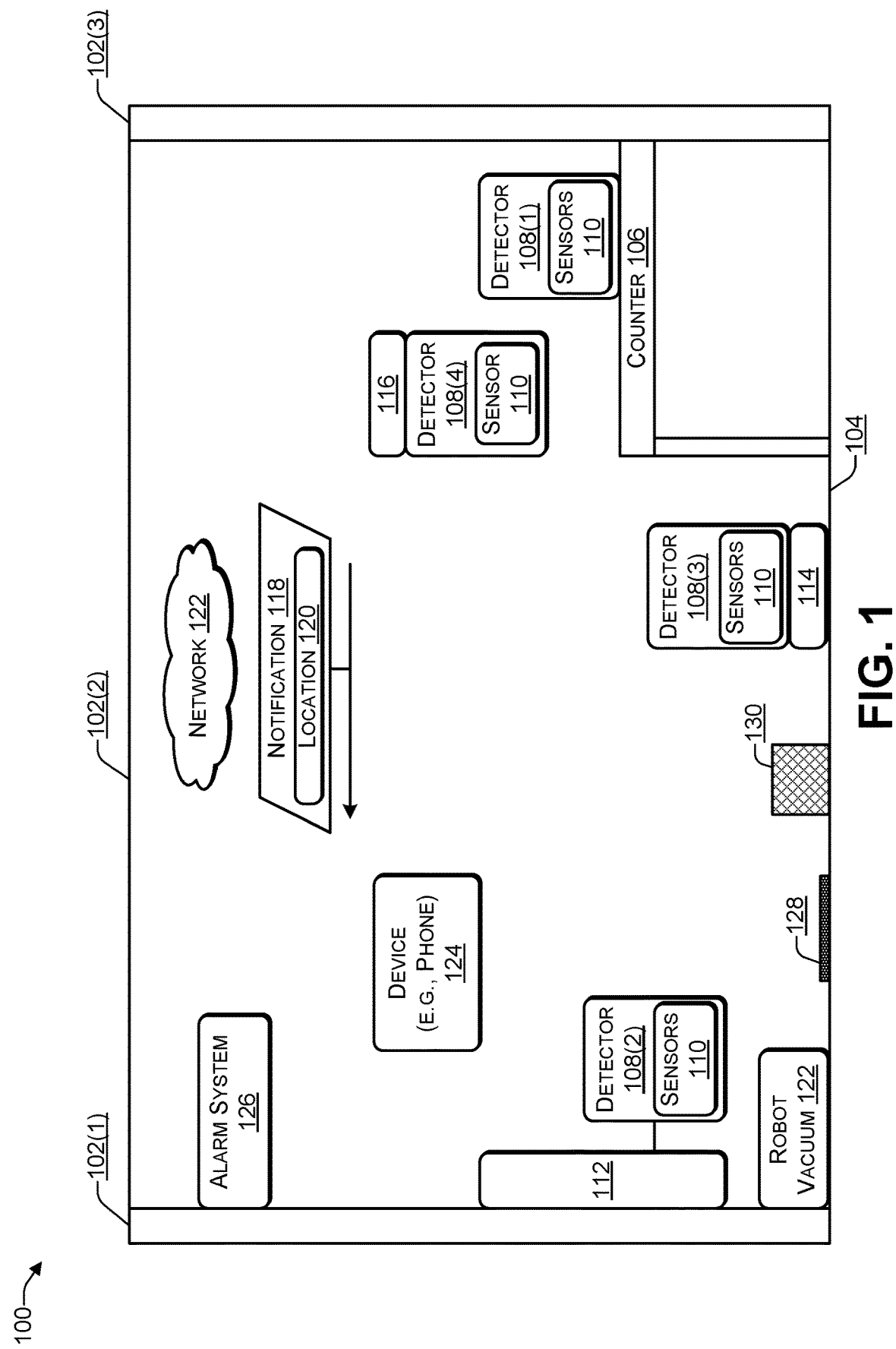
FIG. 1 is a block diagram of a room that includes one or more detectors to detect debris, according to some embodiments.

A detector is described herein to detect debris greater than or equal to a particular size. As used herein, the term debris refers to any type of material, including solids and liquids, whose presence is unwanted in a particular environment. Debris may include everything from dust particles, to larger items, such as spilled solids and/or liquids, plates, bowls, glasses, and their contents. Large debris refers to debris that is larger than a robot vacuum (or similar automated cleaning apparatus) is capable of removing from the environment. When an amount of the debris exceeds a particular threshold, the detector may send a notification to a device, such as a homeowner's smartphone, a robot vacuum cleaner, or both to enable the debris to be removed. The notification is sent wirelessly using, for example, Bluetooth®, WiFi® (IEEE 802.11), cellular (e.g., CDMA, GSM), or another type of wireless technology. The detector uses one or more cameras (e.g., imaging devices) to detect debris, such as particles, spilled items, broken items, pooled liquid, or the like.

The detector captures frames at a default or a user-specified rate, such as X (X>0, X=1, 0.5, 0.25, or the like) frames per second (fps) and performs a comparison of a reference frame with a subsequent frame that was captured at a later point in time than the reference frame. For example, a frame captured at a particular time of day (e.g., 8:00 AM every day) may be selected as the reference frame and the detector may perform a comparison of a subsequently captured frame with the reference frame to determine a difference between the two frames. If the difference is greater than a predetermined and user adjustable threshold, then the detector automatically sends a notification that a cleaning of an area is to be provided. For example, a homeowner's smartphone, the homeowner's robotic vacuum, or both may receive the notification. Receiving the notification may cause the robotic vacuum to automatically initiate cleaning.

In some cases, the notification may provide information that identifies an approximate location where the cleaning is to be provided. For example, in a house, the approximate location may include which floor (e.g., first floor or second floor), which room (e.g., living room floor, dining room floor, kitchen countertop, north-facing wall in the living room, hallway floor, or the like), or another type of location. In some cases, each detector may be associated with a zone that each detector monitors and the zone may be identified in the notification. For example, a detector that monitors the dining room may send a notification indicating that the dining room (or a particular portion thereof) is to be cleaned. In some cases, the detector may determine one or more factors, such as which area is to be cleaned, potential obstacles in the area to be cleaned, whether a vacuum is to be used for the cleaning, whether mopping is to be used for the cleaning, or any combination thereof. If a potential obstacle is detected, the detector or the robot vacuum may send an alert to the homeowner's smartphone requesting removal of the potential obstacle. The detector may use an artificial intelligence engine and an image-recognition algorithm to process the frames (e.g., images) sent by the sensors to determine if there are any sharp or pointy objects, dog poop, on the surface that the detector is monitoring that may be debris that is hazardous to humans, kids, pets, or the like. In such cases, the detector may send a notification to a computing device, illuminate the area (e.g., using a colored light, such as a red light, a green light, or the like) where the potentially hazardous debris has been detected, emit a particular sound to audibly alert a human, or any combination thereof. How the detector responds to detecting potentially hazardous debris may be user configurable. Of course, the robot vacuum may work around any obstacles, such as large debris (e.g., broken glass or ceramic pieces). In some cases, the detector may include in the notification, or send in a separate notification, an indication that debris greater than a size threshold is present. Such large debris may have a size that the robot vacuum may be incapable of removing and may require a human to remove the large debris. The detector may guide the robot vacuum to the area where the debris is located. For example, the detector may display a particular type of light, such as infrared, ultraviolet, a particular color (e.g., green) on the location where the debris was detected. As another example, the detector may use its camera (image sensor plus lens) to detect the robot vacuum and guide the robot vacuum to the location of the debris. To illustrate, the detector may send one or more notifications to the robot vacuum that include guidance information.

In some cases, the detector may emit a particular color light (e.g., green light) to enable a human to easily view the detected debris. The particular color light may make the debris more discernable to the human eye. The detector may include a microphone to detect the sound of glass breaking, food dropping on the floor, or another sound indicative of debris hitting the floor. In some cases, the device may correlate a sound that was detected with one or more frames showing the debris coming into contact with a surface (e.g., floor or wall).

The device may be powered using one or more power sources. In some cases, the device may be powered using batteries (rechargeable or non-rechargeable batteries), a light-based (e.g., solar) charger, or both. For example, rechargeable batteries may be charged using the solar charger. In other cases, the device may be capable of being plugged into a wall outlet (e.g., 110 volts, 220 volts, or the like). In the case of a wall outlet, the detector may preferably be plugged into a lower outlet to enable the upper outlet to be used for an electrical appliance or the like.

As a first example, a debris detector may include a camera comprising an imaging sensor and a lens, a communication interface, one or more processors, and a memory storage device to store instructions executable by the one or more processors to perform various operations. For example, the operations may include receiving a frame captured by the camera. The operations may include receiving a subsequent frame captured by the camera. The operations may include comparing the frame to the subsequent frame to determine a difference. The operations may include determining, using an artificial intelligence trained to recognize debris, that the debris is present in the subsequent frame and absent from the frame. Based on determining that the difference is greater than a threshold, the operations may include sending a notification using the communication interface indicating that debris has been detected. The operations may include determining that a portion of the debris in the subsequent frame has a size that is greater than a size threshold. For example, the size threshold may indicate a maximum size that a robot vacuum is capable of removing. The operations may include sending, in the notification, location data identifying a location associated with a field of view of the lens to identify approximately where the debris is located. For example, receiving the notification may cause a robot vacuum to initiate cleaning the location identified in the notification. The artificial intelligence may be used to determine that the debris that is present in the subsequent frame has the size greater than the size threshold. The operations may include sending a size notification indicating that the portion of the debris in the subsequent frame has the size greater than the size threshold. In some cases, an air transport mechanism may be electrically and mechanically connected to the debris detector to enable the debris detector to function as an aerial drone debris detector. In some other cases, a ground transport mechanism may be electrically and mechanically connected to the debris detector to enable the debris detector to function as a robotic debris detector.

As a second example, a method includes receiving, by one or more processors of a debris detector, a frame captured by the camera. The method includes receiving, by the one or more processors, a subsequent frame captured by the camera. The method includes comparing, by the one or more processors, the frame to the subsequent frame to determine a difference; and determining that the difference is greater than a threshold. The method includes sending, by the one or more processors and using a communication interface of the debris detector, a notification indicating that debris has been detected. The method may include determining that a portion of the debris in the subsequent frame has a size that is greater than a size threshold. For example, the size threshold may indicate a maximum size that a robot vacuum is capable of removing. The method may include sending a size notification indicating that the portion of the debris in the subsequent frame has the size greater than the size threshold. The method may include determining, using an artificial intelligence trained to recognize the debris, that the debris is: present in the subsequent frame and absent from the frame. The method may include determining, using the artificial intelligence, that the debris that is present in the subsequent frame has the size greater than the size threshold. The method may include sending, in the notification, location data identifying a location associated with a field of view of the lens to identify approximately where the debris is located. For example, receiving the notification may cause a robot vacuum to initiate cleaning the location identified in the notification.

FIG. 1 is a block diagram of a room 100 that includes one or more detectors to detect debris, according to some embodiments. The room 100 includes a left wall 102(1), a back wall 102(2), a right wall 102(3), a floor 104, and a representative counter 106 (e.g., kitchen counter, island, desktop, or the like). Note that some rooms may have more than one counter while other rooms may have no counter. For ease of illustration, other surfaces, such as a front wall, are not shown. The room 100 may be part of a house, part of a warehouse, part of a store, or another portion of a residential or a commercial building.

Multiple versions of a detector 108 are shown in FIG. 1 to illustrate different ways in which the detector 108 may be used. Each detector 108 includes one or more sensors 110, including, at least an imaging sensor with a lens ("camera") to capture frames (images captured at a predetermined interval). It should be understood that the imaging sensor captures frames using an attached lens. The field of view of the imaging sensor may depend on the lens being used with the imaging sensor. For example, a wide angle or a fisheye lens may be capable of enabling the imaging sensor to have a field of view of approximately 180°. Of course, based on the type of lens used, the field of view may be greater or less than 180°. The imaging sensor may be capable of detecting debris in light and in darkness because the imaging sensor may use an infrared (or similar) sensor. In this way, the imaging sensor may detect debris 24 hours a day (e.g., both during the day and at night), 7 days a week. In some cases, the lens may be a zoom lens with an adjustable field of view.

The detector 108(1) may be powered using replaceable or rechargeable batteries and may be placed on the counter 106 to enable at least one of the sensors 110 to monitor the counter 106 to determine the presence of debris. The detector 108(2) may be powered by plugging the detector 108(2) into a wall outlet 112. Thus, the detector 108(2) may be capable of converting alternating current (e.g., 110v, 220v, or the like) to direct current. The detector 108(2) may use the sensors 110 to monitor at least a portion of (i) the wall 102(2), (ii) the wall 102(3), and (iii) the floor 104 to determine the presence of debris.

A ground transport mechanism 114 may be attached to a detector, such as the detector 108(3), as shown in FIG. 1. The mechanism 114 may enable the detector 108(3) to navigate one or more rooms, such as the room 100, to identify debris, at a ground level, that may not be in the field of view of the sensors of a stationary detector, such as the detector 108(1) and/or the detector 108(2). For example, debris underneath a piece of furniture (e.g., a sofa) may not be in the field of view of the sensors of a stationary detector. The mechanism 114 may enable the detector 108(3) to autonomously navigate to locations that are not in the field of view of the sensors of stationary detectors.

An air transport mechanism 116 may be attached to a detector, such as the detector 108(4), as shown in FIG. 1. The mechanism 116 may enable the detector 108(4) to navigate one or more rooms, such as the room 100, to identify debris, at an aerial level, that may not be in the field of view of the sensors of a stationary detector, where the field of view may be partially blocked by an object (e.g., furniture, appliance, counter, wall, or the like). For example, if the detector 108(1) is absent from the counter 106, debris on the counter 106 may not be in the field of view of the sensors of a detector where the counter 106 blocks part of the field of view. The mechanism 116 may enable the detector 108(4) to autonomously and aerially navigate to locations that are not in the field of view of the sensors of stationary detectors.

When the sensors 110 of one of the detectors 108 determines that debris, such as debris 128 or debris 130, that was absent in a previous frame (e.g., a reference frame) is present in a subsequent frame, the detector 108 may send a notification 118 to a robot vacuum 122, a device 124 (e.g., a smartphone, a tablet, or another type of computing device), or both. In some cases, the notification 118 may include an approximate location 120. For example, the location 120 may indicate a particular room in a house (e.g., living room, dining room, kitchen, or the like) or a particular location in a particular room (e.g., underneath the dining table in the dining room, near the sofa in the living room, or the like). In some cases, the robot vacuum 122 may do a partial cleaning of an area that includes the location 120 and may not clean the entire floor 104 of the room 100. In other cases, the robot vacuum 122 may clean the entire floor 104 of the room 100.

When the detector 108 detects the debris 128, 130, the detector 108 may determine an approximate size of the debris to determine whether the debris is sufficiently small for the robot vacuum 122 to clean up. For example, in FIG. 1, debris 128 may be small enough for the robot vacuum 122 to clean up while the debris 130 may be too large for the robot vacuum to clean up. If debris, such as the debris 130, is too large for the robot vacuum 122 to clean up, the detector 108 may include in the notification 118 (or send via a separate notification) an indication that a debris having a size sufficient to prevent the robot vacuum 122 from removing it is present. The large debris indication may cause a human remove the large debris (e.g., debris 130) to enable the robot vacuum 122 to clean the area after the large debris has been removed. For example, if a glass, a plate, a vase, or another type of object falls and shatters upon contact with the floor 104, some of the pieces (e.g., debris 128) resulting from the fall may be small enough for the robot vacuum 122 to clean while other pieces (e.g., the debris 130) may be too large for the robot vacuum 122 to clean. In such cases, the notification 118 may indicate the presence of a large debris (e.g., the debris 130). If a human receives the notification 118 and removes the large debris (e.g., the debris 130) before the robot vacuum 122 reaches the location 120, then the robot vacuum 122 may clean any remaining debris (e.g., the debris 128) located in the location 120. If the large debris is not removed before the robot vacuum 122 reaches the location 120, then the robot vacuum 122 may clean around the large debris (e.g., the debris 130) and remove smaller debris (e.g., the debris 128).

The detector 108 may determine an approximate size of the area where the debris is located and send the size information in the notification 118. In some cases, the frame capture may be at a rapid rate (e.g., at least 15 frames per second (fps)) that captures a video of, for example, a glass bottle falling and shattering. The detector 108 operates continuously and may provide updates to the robot vacuum 122 as the debris is being removed, e.g., providing near real-time updates to the robot vacuum 122 on the area where the debris is located. The detector 108 can also detect a presence of liquid on a surface and determine a direction of the flow of the liquid by comparing a frame with one or more subsequent frames. In some cases, the notification 118 may include information about the type of debris, e.g., solid, liquid, and the like. In this way, the robot vacuum 122 can use an appropriate cleaning technique, such as mopping, vacuuming the liquid, vacuuming solid debris, or the like. The detector 108 may determine an approximate time that debris (e.g., solid and/or liquid) has been present and include, in the notification 118, suggestions on how to clean up the debris, including, for example, a type of detergent to use, an amount of detergent to use, and the like.

The notification 118 may be sent wirelessly, using a technology such as Bluetooth®, Wi-Fi®, cellular (e.g., code division multiple access (CDMA) or global system for mobile (GSM)), or another type of wireless technology. In some cases, multiple detectors 108 may form a mesh network to communicate with each other.

The detector 108 may, in some cases, integrate with an alarm system 126. For example, if the sensors 110 are capable of detecting smoke, fire, or both, then the detector 108 may send the notification 118 to the alarm system 126 to cause the alarm system 126 to raise an audible alarm. For example, the sensors 110 may include a temperature sensor (e.g., to detect an increase in temperature), a sensor to detect smoke (e.g., identify suspended particles in air), a fire detector (e.g., to detect the flickering of flames), or the like.

Thus, one or more detectors may be placed in one or more rooms of a residential or commercial property to detect debris on one or more surfaces, such as a floor, a counter, a wall, or another surface. Each detector has a camera comprising an imaging sensor and a lens. The imaging sensor captures multiple frames per minute of a field-of-view of the camera. The detector compares a frame with a subsequent frame and performs a comparison of the two frames to determine a difference between the two frames. If the difference is greater than a threshold, then the detector may determine that debris is present in the subsequent frame and send a notification to a computing device associated with a human, a robot vacuum, or both. In some cases, the detector may determine whether the debris is greater than a threshold size, e.g., a size greater than the robot vacuum is capable of removing. In such cases, the detector may send an indication in the notification (or send a separate notification) to indicate that the debris includes a large piece that may be too large for the robot vacuum to clean and which may require a human to remove.

Figure 2:
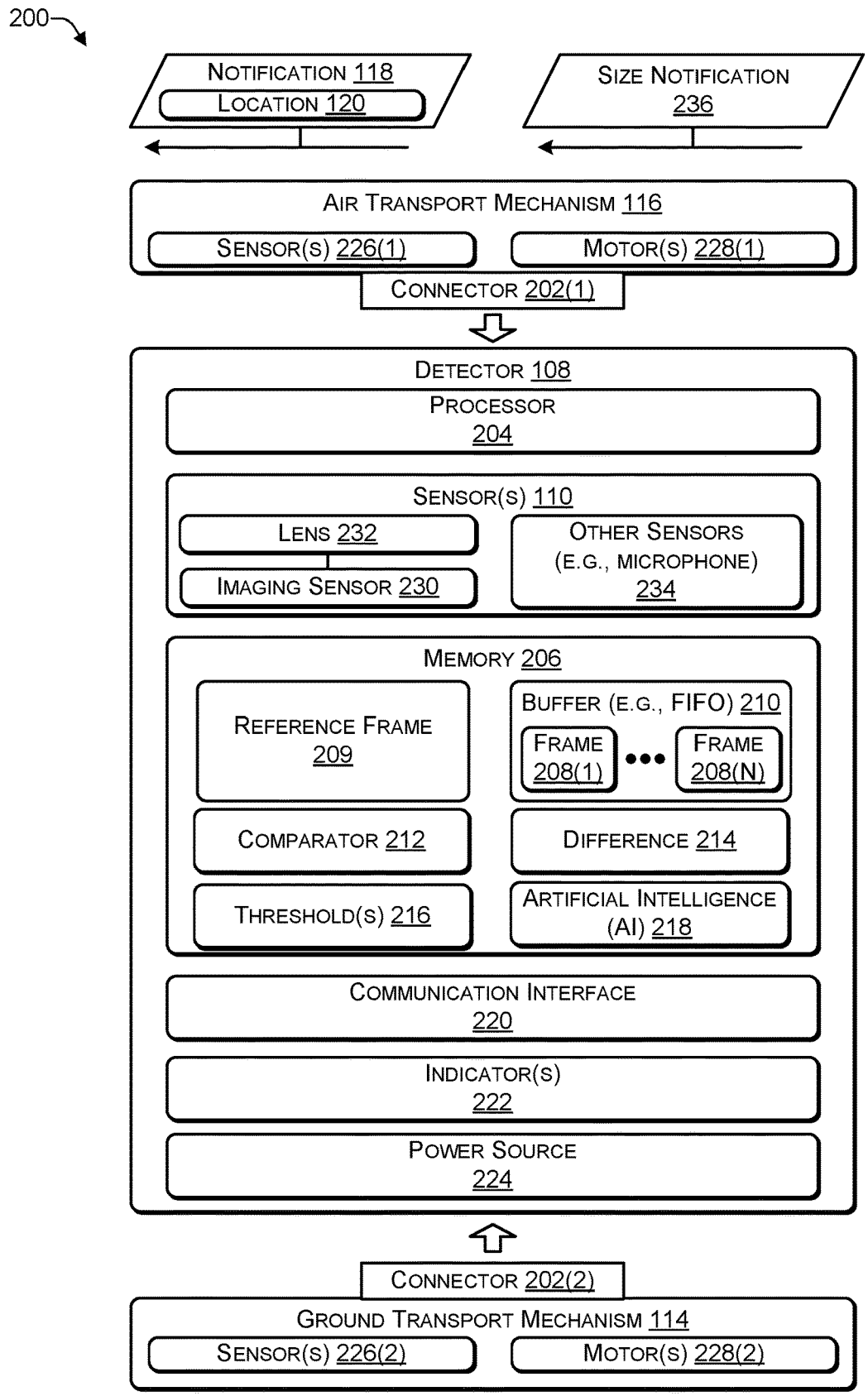
FIG. 2 is a block diagram of a detector to detect debris, according to some embodiments.

FIG. 2 is a block diagram of a detector 200 to detect debris, according to some embodiments. The detector 200 illustrates various components of the detector 108, including optional components.

A connector 202(1) may enable the air transport mechanism 116 to be attached to the detector 108. The connector 202(1) may provide both a mechanical and an electrical connection between the air transport mechanism 116 and the detector 108. The air transport mechanism 116 may include one or more sensors 226(1) and one or more motors 228(1) to enable autonomous aerial navigation of the detector 108 when the air transport mechanism 116 is attached. In this way, when attached, the air transport mechanism 116 may enable the detector 108 to function as an automated drone that navigates through one or more locations in a residential or a commercial building to detect debris. In some cases, the air transport mechanism 116 may be permanently attached to the detector 108 while in other cases the air transport mechanism 116 may be, as illustrated in FIG. 2, temporarily attached to the detector 108.

A connector 202(2) may enable the ground transport mechanism 114 to be attached to the detector 108. The connector 202(2) may provide both a mechanical and electrical connection between the ground transport mechanism 114 and the detector 108. The ground transport mechanism 114 may include one or more sensors 226(2) and one or more motors 228(2) to enable autonomous ground navigation of the detector 108 when the ground transport mechanism 114 is attached. In this way, when attached, the ground transport mechanism 114 may enable the detector 108 to function as an automated crawler that navigates through one or more locations in a residential or a commercial building to detect debris. In some cases, the ground transport mechanism 114 may be permanently attached to the detector 108 while in other cases the ground transport mechanism 114 may be, as illustrated in FIG. 2, temporarily attached to the detector 108.

The sensors 110 may include an imaging sensor 230, a lens 232, other sensors 234 (e.g., microphone) as described herein. The detector 108 may include a processor 204 and a memory 206. The memory 206 may store multiple frames 208(1) to 208(N) (N>1) captured by the imaging sensor 230 at a predetermined time interval, such as one frame every Y milliseconds (Y>0). In some cases, the frames 208 may be stored in a buffer 210. For example, the buffer 210 may be implemented as a first-in first-out (FIFO) or another type of buffer. A comparator module 212 may be executed by the processor 204 to compare two frames, such as a reference frame 209 and a subsequent frame (e.g., frame 208(N)) to determine a difference 214. If the difference 214 exceeds a first threshold of the thresholds 216, then the detector 108 may send the notification 118 of FIG. 1. In some cases, the comparator 212 may determine whether the size of debris in the subsequent frame exceeds a second threshold of the thresholds 216. The second threshold may represent a size that is larger than what a robot vacuum is capable of cleaning up. In such cases, the detector 108 may provide an indication in the notification 118 (or in a separate notification) indicating that the robot vacuum may not be capable of cleaning up some of the debris that is present.

The reference frame 209 may be selected based on various criteria. For example, at the beginning of a day, at a predetermined or a preselected time (e.g., 6:00 AM, 7:00 AM, or the like), a most recently captured of the frames 208 may be selected as the reference frame 209. If debris is detected in a subsequent frame and the debris is not removed within a predetermined period of time, e.g., because the debris is too large for the robot vacuum 122 to remove, then the subsequent frame may be set as the reference frame 209. When the detector 108 determines, by analyzing an additional frame that the debris has been removed, then the detector 108 may set a most recently captured frame (e.g., in which the debris has been removed) as the reference frame 209.

In some cases, the detector may use an artificial intelligence (AI) 218 that is trained to identify debris in a residence, a commercial space, or another type of setting. For example, in a grocery store, the detector 108 may monitor aisles where breakage is common, such as the baby food aisle, to enable debris on the floor to be quickly cleaned to avoid a customer slipping and falling, thereby protecting the customer from injury and the grocery store from liability.

The detector 108 may include a communication interface 220 that the detector 108 uses to send the notification 118. For example, the communication interface 220 may enable the use of communications via Bluetooth®, Wi-Fi®, cellular technology (CDMA or GSM), or another type of wireless communication.

The detector 108 may include one or more indicators 222. For example, the indicators 222 may be colored light emitting diodes (LEDs), a liquid crystal display (LCD), or another type of indicator. To illustrate, when the indicators 222 are LEDs, a green LED may indicate that no debris is present and a red LED may indicate that the presence of debris has been detected. As another illustration a green LED may indicate the absence of debris, yellow may indicate the presence of small debris, and red may indicate the presence of large debris. In this way, a human being can glance at the detector 108 to immediately ascertain whether debris has been detected, without looking at a computing device, such as a smartphone, tablet, or the like.

The detector 108 includes a power source 224, such as a battery (e.g., rechargeable or non-rechargeable), a power converter to convert from alternating current (110v, 220v, or the like) to direct-current (DC) to power the components of the detector 108, another type of power source (e.g., solar), or any combination thereof.

Figure 3:
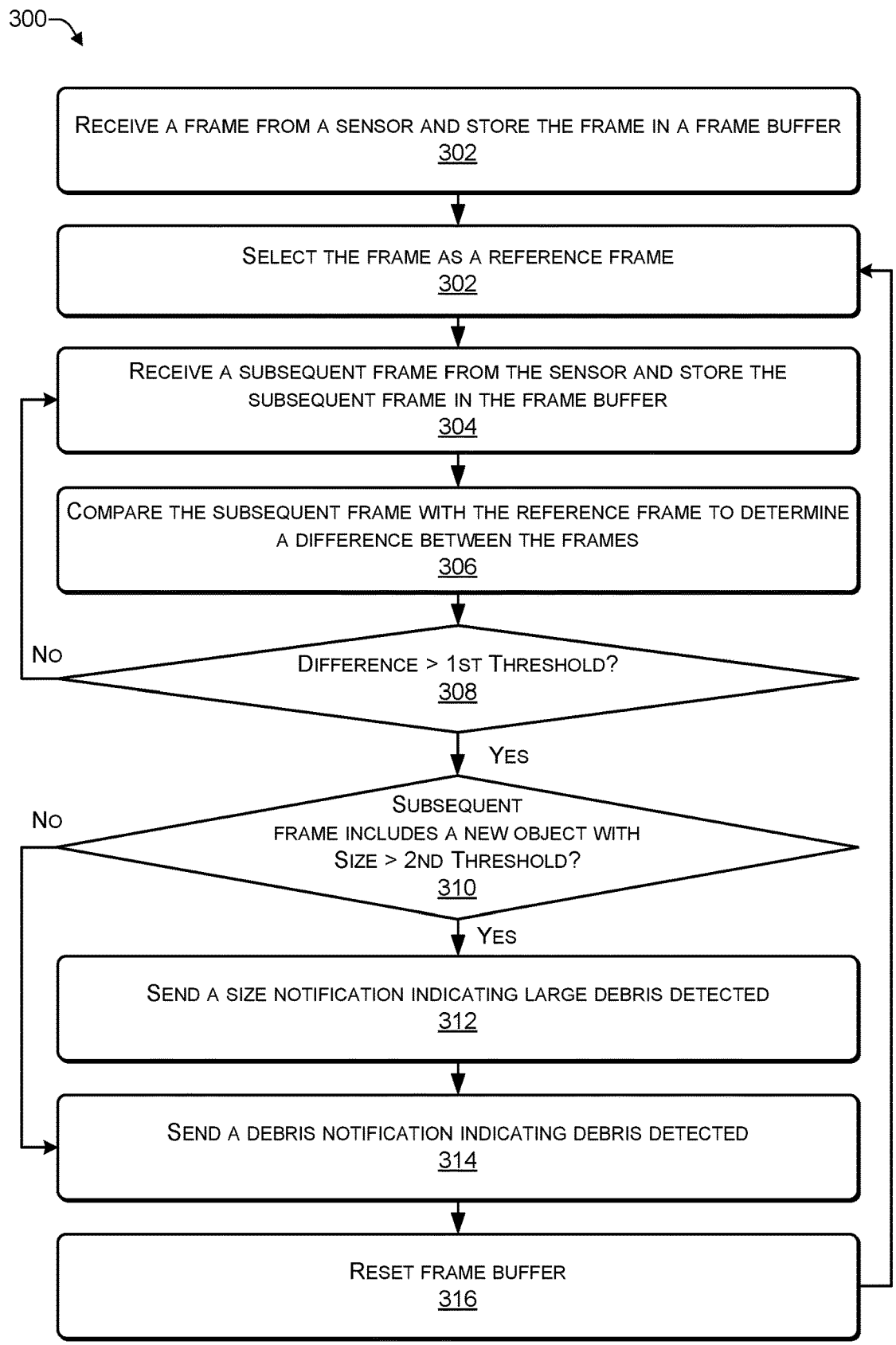
FIG. 3 is a flowchart of a process that includes sending a debris notification, according to some embodiments.
Figure 4:
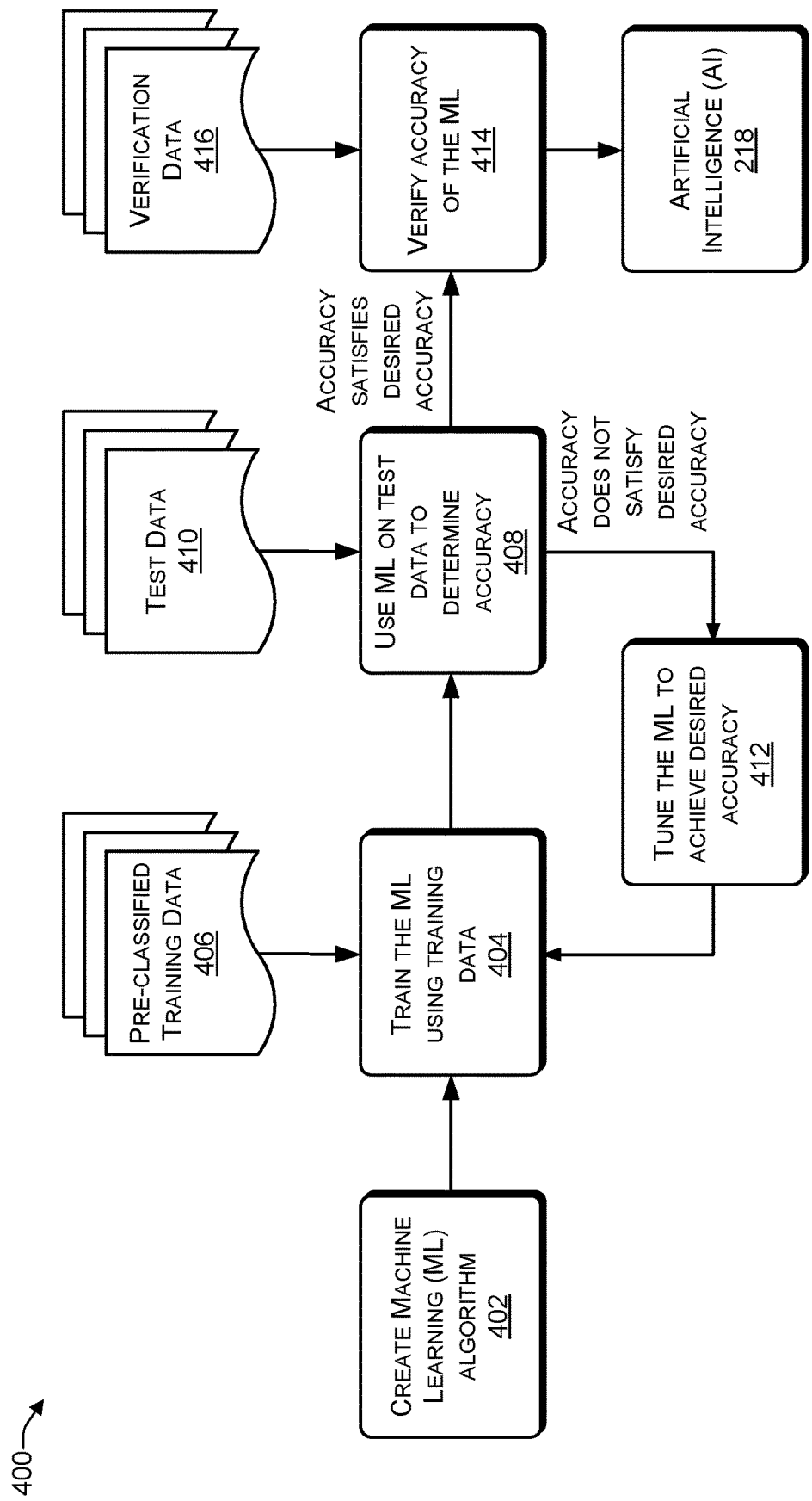
FIG. 4 is a flowchart of a process to train a machine learning algorithm to create an artificial intelligence, according to some embodiments.

In the flow diagrams of FIGS. 3 and 4 each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 300 and 400 are described with reference to FIGS. 1 and 2 as described above, although other models, frameworks, systems and environments may be used to implement this process.

FIG. 3 is a flowchart of a process 300 that includes sending a debris notification, according to some embodiments. The process 300 may be performed by the detector 108 of FIG. 1 and FIG. 2.

At 302, the process may receive a frame from a sensor at a time T1 and store the frame in a frame buffer. At 302, the process may select the frame as a reference frame. At 304, the process may receive a subsequent frame from the sensor at a time T2 (T2>T1) and store the subsequent frame in the frame buffer. For example, in FIG. 2, the detector 108 may receive a frame 208(1) from the imaging center 230 at a time T1. The detector 108 may store the frame 208(1) in the frame buffer 210. The detector 108 may select one of the frames 208 as the reference frame 209. The detector 108 may receive a subsequent frame 208(N) from the imaging sensor 230 at a time T2 that is subsequent to (e.g., occurs after) time T1. The detector 108 may store the subsequent frame 208(N) in the frame buffer 210.

At 306, the process may compare the subsequent frame with the reference frame to determine a difference between the frames. At 308, the process may determine whether the difference is greater than a first threshold. If the process determines, at 308, that "no", the difference is not greater than the first threshold, the process proceeds to 304 to receive another subsequent frame. The process may repeat 304, 306, and 308 until the detector determines that the difference is greater than the first threshold (e.g., until debris is detected). For example, in FIG. 2, the detector 108 may compare the subsequent frame 208(N) with the reference frame 209 to determine the difference 214 between the two frames and determine whether the difference 214 is greater than a first threshold of the thresholds 216. If the difference 214 is not greater than the first threshold, the detector 108 may continue to receive additional frames subsequent to the reference frame 209 from the imaging sensor 230, compare the reference frame 209 with each of the additional subsequent frames to determine the difference 214, and determine whether the difference 214 is greater than the first of the thresholds 216.

If the process determines, at 308, that "yes", the difference is greater than the first threshold (e.g., indicating the presence of debris), then the process may proceed to 310. At 310, the process may determine whether the subsequent frame includes a new object having a size greater than a second threshold. The term "new object" refers to an object (e.g., debris) that is absent from the reference frame but is present in the subsequent frame and therefore present in the difference between the two frames. If the process determines, at 310, that "yes", the subsequent frame includes a new object with a size greater than the second threshold, then the process sends a size notification indicating large debris has been detected, at 312. The process then proceeds to 314. If the process determines, at 310, that "no", the subsequent frame does not include a new object having a size greater than the second threshold, then the process proceeds to 314. For example, in FIG. 2, if the detector 108 determines that the difference 214 between the subsequent frame 208(N) and the reference frame 209 is greater than the first of the thresholds 216, then the detector 108 may determine whether the subsequent frame includes a new object (e.g., an object that is present in the subsequent frame but that is absent from the reference frame) having a size greater than a second of the thresholds 216. The second of the thresholds 216 refers to a size that the robot vacuum 122 of FIG. 1 is incapable of cleaning up. For example, if a bowl of cereal drops to the floor in the dining room, then the robot vacuum 122 may be capable of cleaning (e.g., removing) the cereal (e.g., the debris 128 of FIG. 1) that spilt out of the bowl onto the floor but may be incapable of removing the bowl (e.g., the debris 130) and any cereal underneath the bowl (e.g., between the bowl and the floor). If the detector 108 determines that the new object has a size greater than the second of the thresholds 216, then the detector 108 may send a size notification 236 (e.g., to the device 124, the robot vacuum 122, or both) indicating that large debris (e.g., the debris 130) has been detected. For example, the robot vacuum 122 may be incapable of removing the large debris (e.g., the debris 130) and may wait for a human to remove the large debris.

At 314, the process sends a debris notification indicating debris detected. For example, in FIG. 2, after the detector 108 determines whether the new object (e.g., the debris 128) has a size less than or equal to the second of the thresholds 216, the detector 108 may send the notification 118. The notification 118 may include the location 120 associated with a field-of-view of the lens 232. The notification 118 may be received by a computing device, such as a smartphone, associated with a human, by a robot vacuum cleaner, by an alarm system, or any combination thereof.

At 316, the process may reset the frame buffer. For example, resetting the frame buffer may prevent the process from sending subsequent debris notifications until the debris has been removed. For example, in FIG. 2, the detector 108 may reset the buffer 210. In some cases, the detector 108 may select a new reference frame from the buffer 210 before resetting the buffer 210.

Thus, a detector having a camera, comprising a lens and an imaging sensor, may be used to monitor a portion of a room in a residence, a commercial building, or the like. The imaging sensor may capture frames that are stored in a frame buffer. The detector may select one of the frames from the frame buffer as a reference frame. The detector may compare a subsequent frame to the reference frame to determine whether a difference between the two frames is greater than a first threshold. If the difference between the two frames is greater than the first threshold, then the detector may determine whether the subsequent frame includes a new object (e.g., that is absent from the reference frame and present in the subsequent frame) that has a size greater than a second threshold, where the second threshold represents a size that a robot vacuum is incapable of removing. If the new object in the subsequent frame is greater than the second threshold, then the detector may send a notification indicating that a large object has been detected and may require removal by a human. After determining whether the subsequent frame includes a new object, the detector may send a notification indicating that debris has been detected and specify a location, associated with a field-of-view of the lens, where the debris has been detected. The notification may be sent to a device associated with a human, a robot vacuum, another device, or any combination thereof.

FIG. 4 is a flowchart of a process 400 to train a machine learning algorithm to create the AI 218, according to some embodiments. The process 400 may be performed by a server, prior to the detector 108 of FIG. 1 being deployed.

At 402, a machine learning algorithm (e.g., software code) may be created by one or more software designers. At 404, the machine learning algorithm may be trained using pre-classified training data 406 (e.g., debris common to residential homes, to commercial spaces, or both). For example, the training data 406 may have been pre-classified by humans, by an artificial intelligence, or a combination of both. After the machine learning has been trained using the pre-classified training data 406, the machine learning may be tested, at 408, using test data 410 to determine an accuracy of the machine learning. For example, in the case of a classifier, the accuracy of the classification may be determined using the test data 410.

If an accuracy of the machine learning does not satisfy a desired accuracy (e.g., 95%, 98%, 99% accurate), at 408, then the machine learning code may be tuned, at 412, to achieve the desired accuracy. For example, at 412, the software designers may modify the machine learning software code to improve the accuracy of the machine learning algorithm. After the machine learning has been tuned, at 412, the machine learning may be retrained, at 404, using the pre-classified training data 406. In this way, 404, 408, 412 may be repeated until the machine learning is able to classify the test data 410 (e.g., identify debris) with the desired accuracy.

After determining, at 408, that an accuracy of the machine learning satisfies the desired accuracy, the process may proceed to 414, where verification data 416 may be used to verify an accuracy of the machine learning. After the accuracy of the machine learning is verified, at 414, the machine learning 130, which has been trained to provide a particular level of accuracy may be used as the AI 218. For example, the AI 218 may be trained to identify liquid debris, solid debris, and determine whether the debris is greater than a particular size threshold. For example, the AI 218 may be capable of identifying small debris (e.g., the debris 130) that the robot vacuum 122 can remove and large debris (e.g., the debris 130) that the robot vacuum 122 is incapable of removing.

Figure 5:
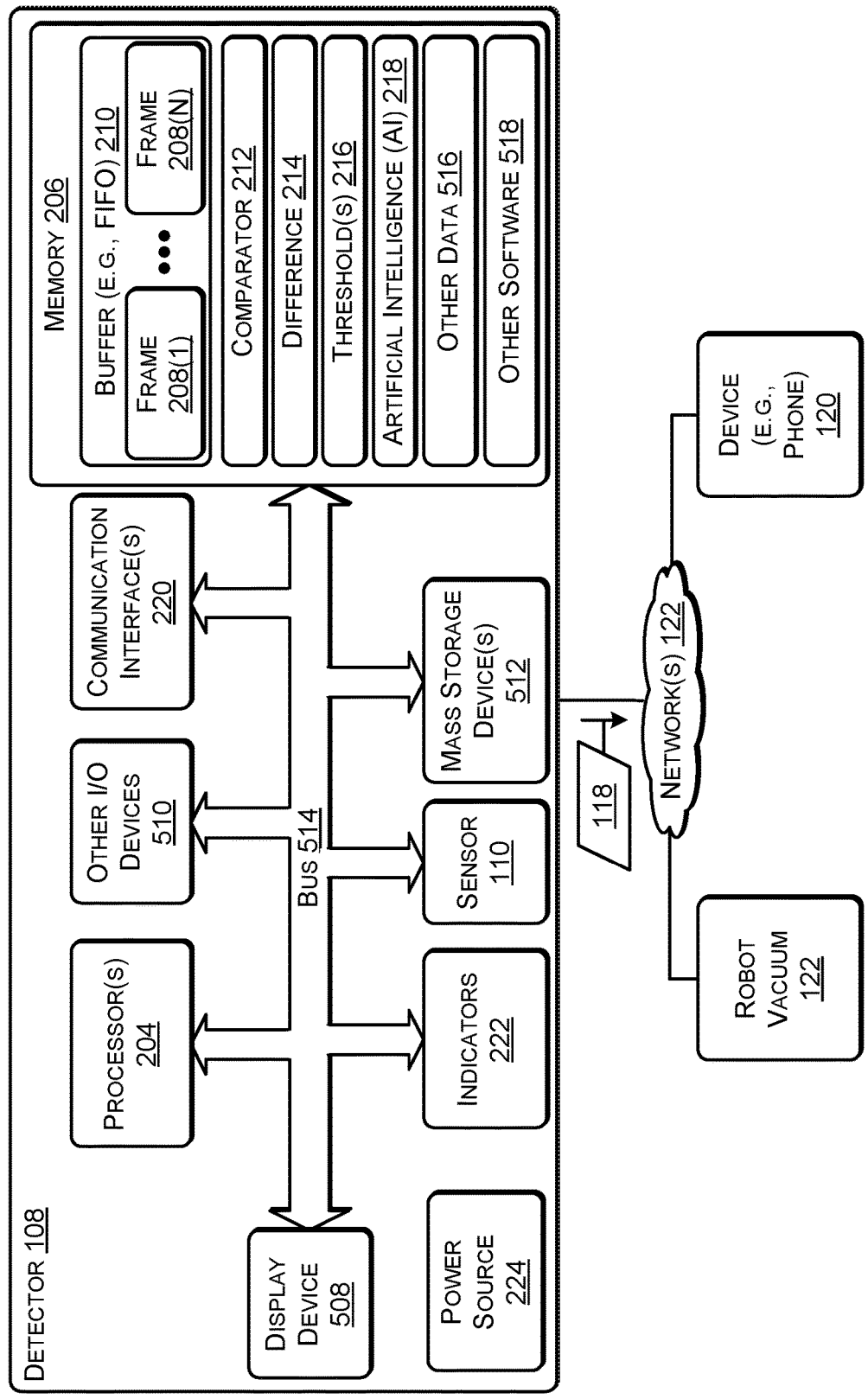
FIG. 5 illustrates an example configuration of a computing device that can be used to implement the systems and techniques described herein.

FIG. 5 illustrates an example configuration of a device 500 that can be used to implement the systems and techniques described herein, such as for example, the detector 108 of FIG. 1 and FIG. 2.

The device 500 may include one or more processors 502 (e.g., central processing unit (CPU), graphics processing unit (GPU), or the like), a memory 504, communication interfaces 506, a display device 508 (e.g., liquid crystal display (LCD)), other input/output (I/O) devices 510 (e.g., keyboard, trackball, and the like), and one or more mass storage devices 512 (e.g., disk drive, solid state disk drive, or the like), configured to communicate with each other, such as via one or more system buses 514 or other suitable connections. While a single system bus 514 is illustrated for ease of understanding, it should be understood that the system buses 514 may include multiple buses, such as a memory device bus, a storage device bus (e.g., serial ATA (SATA) and the like), data buses (e.g., universal serial bus (USB) and the like), video signal buses (e.g., ThunderBolt®), digital video interface (DVI), high definition media interface (HDMI), and the like), power buses, etc.

The processors 502 are one or more hardware devices that may include a single processing unit or a number of processing units, all of which may include single or multiple computing units or multiple cores. The processors 502 may include a graphics processing unit (GPU) that is integrated into the CPU or the GPU may be a separate processor device from the CPU. The processors 502 may be implemented as one or more microprocessors, microcomputers, microcontrollers, digital signal processors, central processing units, graphics processing units, state machines, logic circuitries, and/or any devices that manipulate signals based on operational instructions. Among other capabilities, the processors 502 may be configured to fetch and execute computer-readable instructions stored in the memory 504, mass storage devices 512, or other computer-readable media.

Memory 504 and mass storage devices 512 are examples of computer storage media (e.g., memory storage devices) for storing instructions that can be executed by the processors 502 to perform the various functions described herein. For example, memory 504 may include both volatile memory and non-volatile memory (e.g., RAM, ROM, or the like) devices. Further, mass storage devices 512 may include hard disk drives, solid-state drives, removable media, including external and removable drives, memory cards, flash memory, floppy disks, optical disks (e.g., CD, DVD), a storage array, a network attached storage, a storage area network, or the like. Both memory 504 and mass storage devices 512 may be collectively referred to as memory or computer storage media herein and may be any type of non-transitory media capable of storing computer-readable, processor-executable program instructions as computer program code that can be executed by the processors 502 as a particular machine configured for carrying out the operations and functions described in the implementations herein.

The device 500 may include one or more communication interfaces 506 for exchanging data with other devices (e.g., the device 120, the robot vacuum 122, or the like). The communication interfaces 506 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, ZigBee, cellular, satellite, etc.), the Internet and the like. Communication interfaces 506 can also provide communication with external storage, such as a storage array, network attached storage, storage area network, cloud storage, or the like.

The display device 508 may be used for displaying content (e.g., information and images). Other I/O devices 510 may be devices that receive various inputs from a user and provide various outputs to the user, and may include a keyboard, a touchpad, a mouse, a printer, audio input/output devices, and so forth.

The computer storage media, such as memory 116 and mass storage devices 512, may be used to store software and data, including, for example, the buffer 210, the comparator 212, the difference 214, the thresholds 216, the AI 218, other data 516, and other software 518.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A debris detector comprising:
    a camera comprising an imaging sensor and a lens;
    a communication interface;
    one or more processors; and
    a memory storage device to store instructions executable by the one or more processors to perform operations comprising:
        receiving a frame captured by the camera;
        receiving a subsequent frame captured by the camera;
        comparing the frame to the subsequent frame to determine a difference;
        determining, by an artificial intelligence executed by the one or more processors and based on the difference, that debris having a size greater than a debris threshold is present in the subsequent frame;
        based on determining, by the artificial intelligence, that the size of the debris is less than or equal to a maximum size that a robot vacuum is capable of removing, sending, using the communication interface, a first notification to the robot vacuum indicating that the debris has been detected; and
        based on determining, by the artificial intelligence, that the size of the debris is greater than the maximum size that the robot vacuum is capable of removing, sending using the communication interface, a second notification to a computing device associated with a user indicating that the robot vacuum is incapable of removing the debris.

2. The debris detector of claim 1, wherein the debris comprises:
    one or more dust particles,
    a spilled solid,
    a spilled liquid, or
    any combination thereof.

3. The debris detector of claim 1, further comprising:
    one or more indicators to indicate whether the debris has been detected, wherein the one or more indicators display:
        green to indicate the debris is absent,
        yellow to indicate that the debris is present; and
        red to indicate that the size of the debris that is present is greater than the maximum size.

4. The debris detector of claim 1, further comprising:
    a microphone to detect a sound of the debris coming into contact with a surface.

5. The debris detector of claim 1, further comprising:
    including, in the first notification, location data identifying a location associated with a field of view of the lens to identify approximately where the debris is located;
    wherein receiving the first notification causes a robot vacuum to initiate cleaning the location identified in the first notification.

6. The debris detector of claim 1, further comprising:
    an air transport mechanism that is electrically and mechanically connected to the debris detector to enable the debris detector to function as an aerial drone debris detector to identify, at an aerial level, the debris that is not in a field of view of a stationary detector.

7. The debris detector of claim 1, further comprising:
    a ground transport mechanism that is electrically and mechanically connected to the debris detector to enable the debris detector to function as a robotic debris detector to autonomously navigate to locations that are not in the field of view of a stationary detector.

8. A debris detector comprising:
    one or more processors; and
    a memory storage device to store instructions executable by the one or more processors to perform operations comprising:
        receiving a frame captured by a camera;
        receiving a subsequent frame captured by the camera;
        comparing the frame to the subsequent frame to determine a difference;
        determining, by an artificial intelligence executed by the one or more processors and based on the difference, that debris having a size greater than a debris threshold is present in the subsequent frame;
        based on determining, by the artificial intelligence, that the size of the debris is less than or equal to a maximum size that a robot vacuum is capable of removing, sending a first notification to the robot vacuum indicating that the debris has been detected; and
        based on determining, by the artificial intelligence, that the size of the debris is greater than the maximum size that the robot vacuum is capable of removing, sending using a communication interface, a second notification indicating that the robot vacuum is incapable of removing the debris.

9. The debris detector of claim 8, wherein the debris comprises:
    one or more dust particles,
    a spilled solid,
    a spilled liquid, or
    any combination thereof.

10. The debris detector of claim 8, wherein:
the debris is:
- present in the subsequent frame; and
- absent from the frame.

11. The debris detector of claim 8, further comprising:
a microphone to detect a sound of the debris coming into contact with a surface.

12. The debris detector of claim 8, the operations further comprising:
correlating the sound with one or more frames, captured by the camera, that show the debris coming into contact with a surface.

13. The debris detector of claim 8, further comprising:
one or more indicators to indicate whether the size of the debris is less than or equal to the maximum size that the robot vacuum is capable of removing.

14. The debris detector of claim 8, further comprising one of:
- an air transport mechanism that is electrically and mechanically connected to the debris detector to enable the debris detector to function as an aerial drone debris detector; or
- a ground transport mechanism that is electrically and mechanically connected to the debris detector to enable the debris detector to function as a robotic debris detector.

15. A method comprising:
- receiving, by one or more processors of a debris detector, a frame captured by a camera of the debris detector;
- receiving, by the one or more processors, a subsequent frame captured by the camera;
- comparing, by the one or more processors, the frame to the subsequent frame to determine a difference; and
- determining that the difference is greater than a debris threshold;
- determining, by an artificial intelligence executed by the one or more processors and based on the difference, that debris having a size greater than a debris threshold is present in the subsequent frame;
- based on determining, by the artificial intelligence, that the size of the debris is less than or equal to a maximum size that a robot vacuum is capable of removing, sending a first notification indicating that debris has been detected; and
- based on determining, by the artificial intelligence, that the size of the debris is greater than the maximum size that the robot vacuum is capable of removing, sending using a communication interface, a second notification indicating that the robot vacuum is incapable of removing the debris.

16. The method of claim 15, wherein the debris comprises:
- one or more dust particles,
- a spilled solid,
- a spilled liquid, or
- any combination thereof.

17. The method of claim 15, further comprising:
- detecting, using a microphone of the debris detector, a sound of the debris coming into contact with a surface; and
- correlating the sound with one or more frames, captured by the camera, that show the debris coming into contact with the surface.

18. The method of claim 15, wherein:
the debris detector includes one or more indicators to indicate whether the size of the debris is less than or equal to the maximum size that the robot vacuum is capable of removing.

19. The method of claim 15, further comprising:
sending, in the first notification, location data identifying a location associated with a field of view of the lens to identify approximately where the debris is located.

20. The method of claim 19, wherein:
receiving the first notification causes the robot vacuum to initiate cleaning the location identified in the first notification.

\* \* \* \* \*